(12) United States Patent
Hata et al.

(10) Patent No.: US 7,315,164 B2
(45) Date of Patent: Jan. 1, 2008

(54) DRIVE UNIT PROVIDED WITH POSITION DETECTING DEVICE

(75) Inventors: Yoshiaki Hata, Ashiya (JP); Kazumi Sugitani, Sakai (JP); Ryuichi Yoshida, Sakai (JP); Shuichi Fujii, Matsubara (JP); Hideaki Nakanishi, Mishima-gun (JP); Takayuki Hoshino, Osaka (JP); Hirohisa Sueyoshi, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 27 days.

(21) Appl. No.: 11/342,408

(22) Filed: Jan. 30, 2006

(65) Prior Publication Data

US 2006/0170418 A1     Aug. 3, 2006

(30) Foreign Application Priority Data

Feb. 1, 2005    (JP)    ............................. 2005-024837

(51) Int. Cl.
*G01B 7/14*    (2006.01)
(52) U.S. Cl. .............................. 324/207.24; 324/207.2; 356/614
(58) Field of Classification Search ................ 324/207.2–207.25; 356/614
See application file for complete search history.

(56) References Cited

U.S. PATENT DOCUMENTS

| | | | |
|---|---|---|---|
| 4,620,253 A | 10/1986 | Garwin et al. | ............... 360/107 |
| 5,200,776 A | 4/1993 | Sakamoto | ............... 354/195.12 |
| 6,498,482 B2 * | 12/2002 | Schroeder | ............... 324/207.21 |
| 7,088,096 B2 * | 8/2006 | Etherington et al. | ... 324/207.24 |

FOREIGN PATENT DOCUMENTS

| | | |
|---|---|---|
| JP | 08-275496 A | 10/1996 |
| JP | 2000-205809 A | 7/2000 |
| JP | 2003-185406 A | 7/2003 |
| JP | 2004-039068 A | 2/2004 |

* cited by examiner

*Primary Examiner*—Jay M Patidar
(74) *Attorney, Agent, or Firm*—Sidley Austin LLP (57) ABSTRACT

A drive unit in accordance with the present invention is provided with a magnetic field generating member generating a magnetic field, a magnetic field detecting device constituted by first, second and third magnetic field detecting elements detecting the magnetic field, and a piezoelectric actuator moving the magnetic field generating member. When executing a relative positioning between the magnetic field generating member and the magnetic field detecting device on the basis of a detection result by the magnetic field detecting device, a first positioning is executed on the basis of the detection result of the first and second magnetic field detecting elements in a predetermined region, and a second positioning is executed on the basis of the detection result of the third magnetic field detecting element at a predetermined point apart from the predetermined region, within a movable range in which the magnetic field generating member moves. In accordance with the structure, it is possible to position the movable body at a high precision, even in the case that a plurality of position detecting points of the movable body of the drive unit exist at a wide interval.

25 Claims, 7 Drawing Sheets

DRIVE UNIT PROVIDED WITH POSITION DETECTING DEVICE

The present application claims priority to Japanese Patent Application No. 2005-024837 filed on Feb. 1, 2005, the entire contents of which are hereby incorporated by reference.

BACKGROUND OF THE INVENTION

1. Field of the Invention

The present invention relates to a drive unit, and more particularly to a drive unit which is preferable for a lens drive mechanism or the like in an optical equipment, for example, an imaging apparatus (a digital camera, a video camera and the like), an optical pickup apparatus, an optical measuring equipment or the like.

2. Description of the Related Art

As a drive unit applied to a lens drive mechanism in an imaging apparatus, an optical pickup apparatus or the like, various types of structures have been conventionally proposed. However, classifying roughly while paying attention to a drive source thereof, there are a magnetic force source type employing an electromagnetic motor or the like as a drive source, and a non-magnetic force source type employing a piezoelectric actuator or the like as the drive source. As an example of the former, for example, in Japanese Unexamined Patent Publication No. 8-275496, there is disclosed a drive unit provided with a propelling field magnet which is fixed to a movable member so as to be relatively at a standstill with respect to the movable member.

In this drive unit, the structure is made such that a position of the movable member is detected on the basis of a displacement amount detected by a magnetic sensor which is integrally provided with the movable member, however, since the drive source displacing the movable member is constituted by the electromagnetic motor, a high pass filter treatment is applied in correspondence to a drive speed of the movable member so as to remove an offset in such a manner that no offset is superposed on an output of the magnetic sensor by a leakage flux generated from the field magnet.

On the other hand, as an example of the latter, there are listed up a drive unit described in Japanese Unexamined Patent Publication No. 2000-205809, Japanese Unexamined Patent Publication No. 2003-185406 and Japanese Unexamined Patent Publication No. 2004-39068. For example, in Japanese Unexamined Patent Publication No. 2000-205809, a drive unit having a piezoelectric actuator as the drive source is disclosed. In the drive unit, there is employed a position detecting method of the movable member of detecting a position of the movable member which is frictionally engaged with the drive member by utilizing an electric resistance of the drive member fixed to one end of a piezoelectric element. Japanese Unexamined Patent Publication No. 2003-185406 discloses a drive unit having a piezoelectric actuator as the drive source, and discloses a method of detecting the position of the movable member on the basis of an electrostatic capacity change between a movable electrode provided in the movable member and a fixed electrode provided in a fixed portion. Further, Japanese Unexamined Patent Publication No. 2004-39068 discloses a drive unit moving a lens by using a piezoelectric actuator as the drive source for compensating a spherical aberration caused by a thickness unevenness of a cover layer of an optical disc, however, a structure relating to the position detection of the lens is not shown.

However, in the drive unit described in Japanese Unexamined Patent Publication No. 8-275496, it is necessary to apply the high pass filter treatment against the problem that the offset is superposed on the output of the magnetic sensor by the leakage flux generated from the drive source (the electromagnetic motor). Accordingly, a detection circuit becomes complicated, and the structure becomes disadvantageous in view of a cost and a reliability. Further, there is a problem that it is hard to manufacture a field magnet in which N poles and S poles are alternately arranged, precisely and with a high resolution.

On the other hand, in the drive units described in Japanese Unexamined Patent Publication No. 2000-205809 and Japanese Unexamined Patent Publication No. 2003-185406, the problem mentioned above is not generated, however, the following disadvantage is generated in a point of detecting the position of the movable member. In other words, in the drive unit described in Japanese Unexamined Patent Publication No. 2000-205809, since a contact type sensing method of detecting the position of the movable member by utilizing an electric resistance of the drive member, a contact resistance between the movable member and the drive member fluctuates, and it is hard to obtain a high resolution. In order to improve an actuator performance, the drive member having a reduced weight and a high rigidity is desired, however, there is a problem that it is hard to select a material of the drive member for establishing both of the electric resistance value and the high rigidity for sensing. The drive unit described in Japanese Unexamined Patent Publication No. 2003-185406 employs a non-contact type sensing means, however, since it is necessary to apply an alternating voltage to the movable electrode or the fixed electrode, the detection circuit becomes complicated and the structure becomes disadvantageous in view of the cost and the reliability. Further, there is a problem that it is necessary to make a gap between the fixed electrode and the movable electrode extremely small for obtaining a high resolution.

Further, as a problem from the other view point, there can be listed up a reduction of the position detecting precision caused by the fluctuation of an operating environment of the drive unit. For example, the method in Japanese Unexamined Patent Publication No. 8-275496 employs the magnetic sensor for detecting the position of the movable member, however, since a sensing property thereof displaces on the basis of an environmental temperature or the like, the position detecting precision of the movable member is lowered by the change of the environmental temperature or the like. Further, in the case that a plurality of position detecting points of the movable member exist at a wide interval, a necessary position precision can not be obtained, and each of the members and the space are increased in accordance with an increase in a moving amount of the movable member.

SUMMARY OF THE INVENTION

A main object of the present invention is to provide a drive unit provided with a position detecting device which can position a movable body at a high precision, even in the case that a plurality of position detecting points of the movable body exist at a wide interval.

In order to achieve the object mentioned above, in accordance with the present invention, there is provided a drive unit comprising:

a magnetic field generating member for generating a magnetic field;

a magnetic field detecting device including first, second and third magnetic field detecting elements for detecting the magnetic field;

a driving device for moving the magnetic field generating member or the magnetic field detecting device; and the drive unit executing a relative positioning between the magnetic field generating member and the magnetic field detecting device on the basis of a detection result by the magnetic field detecting device, wherein a first positioning is executed on the basis of the detection result of the first and second magnetic field detecting elements in a predetermined region, and a second positioning is executed on the basis of the detection result of the third magnetic field detecting element at a predetermined point apart from the predetermined region, within a movable range in which the magnetic field generating member or the magnetic field detecting device moves.

Further, in accordance with the other aspect of the present invention, the second positioning is executed at a relative position at a time when a center of the magnetic field generating member comes closest to the third magnetic field detecting element.

Further, in accordance with the other aspect of the present invention, a magnetic force line generated in the magnetic field generating member is symmetrical with respect to a plane which is vertical to a relative moving direction between the magnetic field generating member and the magnetic field detecting device and passes through a center of the magnetic field generating member.

Further, in accordance with the other aspect of the present invention, the driving device is provided with a guide shaft guiding the movement of the magnetic field generating member or the magnetic field detecting device, and the first, second and third magnetic field detecting elements are arranged in parallel to a guide direction of the guide shaft.

Further, in accordance with the other aspect of the present invention, both of the first and second magnetic field detecting elements output an electric signal corresponding to the detected magnetic field, and execute the first positioning on the basis of a result of an arithmetic operation in accordance with the following formula (f1).

$$K \cdot (A-B)/(A+B) \tag{f1}$$

in the formula

A: output of electric signal from first magnetic field detecting element

B: output of electric signal from second magnetic field detecting element

K: proportionality factor

Further, in accordance with the other aspect of the present invention, there is provided a drive unit comprising:

first and second magnetic field detecting elements arranged in adjacent to each other;

a third magnetic field detecting element arranged at a position apart from the first and second magnetic field detecting elements; and a movable body capable of relatively moving in parallel to an arranged direction of the first and second magnetic field detecting elements, wherein the movable body has a magnetic field generating member positioned so as to come close to the first, second and third magnetic field detecting elements, a first positioning is executed on the basis of a result of an arithmetic operation using an output from the first and second magnetic field detecting elements in the case that the magnetic field generating member comes close to the first and second magnetic field detecting elements, and a second positioning is executed on the basis of only an output from the third magnetic field detecting element in the case that the magnetic field generating member comes close to the third magnetic field detecting element.

Further, in accordance with the other aspect of the present invention, there is provided a drive unit comprising:

one magnetic field generating member for generating a magnetic field symmetrically;

a plurality of magnetic field detecting elements for detecting the magnetic field and outputting an electric signal in correspondence thereto; and the drive unit executing a relative positioning between the magnetic field generating member and the magnetic field detecting element on the basis of an output from the magnetic field detecting elements, wherein a first positioning is executed on the basis of a result of an arithmetic operation using an output from two adjacent magnetic field detecting elements in a plurality of magnetic field detecting elements, and a second positioning is executed on the basis of a detection result of a point at which an output from one magnetic field detecting element in a plurality of magnetic field detecting elements becomes approximately zero.

Further, in accordance with the other aspect of the present invention, one magnetic field detecting element used for the second positioning corresponds to the other magnetic field detecting element than two magnetic field detecting elements used for the first positioning.

Further, in accordance with the other aspect of the present invention, both of two magnetic field detecting elements used for the first positioning correspond to the first and second magnetic field detecting elements outputting an electric signal in correspondence to the detected magnetic field, and execute the first positioning on the basis of a result of an arithmetic operation in accordance with the following formula (f1).

$$K \cdot (A-B)/(A+B) \tag{f1}$$

in the formula

A: output of electric signal from first magnetic field detecting element

B: output of electric signal from second magnetic field detecting element

K: proportionality factor

Further, in accordance with the other aspect of the present invention, temperatures in portions where the first and second magnetic field detecting elements are installed are detected on the basis of a value of an output A of an electric signal from the first magnetic field detecting element, a value of an output B of an electric signal from the second magnetic field detecting element, or a combined value of the outputs A and B of the electric signal from the first and second magnetic field detecting elements and a temperature compensation of one magnetic field detecting element used for the second positioning is executed on the basis of the detection result.

Further, in accordance with the other aspect of the present invention, at least one of the first, second and third magnetic field detecting elements including by a Hall element.

Further, in accordance with the other aspect of the present invention, there is provided a drive unit comprising:

a position information generator for generating a position information;

a position information detector including first, second and third position information detecting elements for detecting the position information; and a driving device for moving the position information generator or the position information detector, wherein the drive unit executes a relative positioning between the position information generator and the position information detector on the basis of a detection result in the position information detector, wherein a first positioning is executed on the basis of the detection result of the first and second position information detecting elements in a predetermined region, and a second positioning is executed on the basis of the detection result of the third position information detecting element at a predetermined point apart from the predetermined region, within a movable range in which the position information generator or the position information detector moves.

Further, in accordance with the other aspect of the present invention, the first positioning is executed within a range in which each of the outputs of the first position information detecting element and the second position information detecting element does not reach a minimum value or a maximum value, and the second positioning is executed at a position at which the output of the third position information detecting element comes to the minimum value or the maximum value.

Further, in accordance with the other aspect of the present invention, the position information generator has a physical quantity distribution which has an opposite sign and is symmetrical along a moving direction of the position information generator or the position information detector, on the basis of a center of a position information generating portion.

Further, in accordance with the other aspect of the present invention, the first, second and third position information detecting elements includes an optical device having a light emitting portion and a light receiving portion, and the position information generator is provided with a function of receiving the light emitted from the light emitting portion so as to make a quantity of light incident to the light receiving portion variable.

Further, in accordance with the other aspect of the present invention, the driving device includes a piezoelectric actuator which is provided with a piezoelectric element, a drive member fixed to one end of the piezoelectric element, and a movable member movably held to the drive member.

Further, in accordance with the other aspect of the present invention, there is provided a drive unit comprising:

first and second position information detecting elements arranged in adjacent to each other;

a third position information detecting element arranged at a position apart from the first and second position information detecting elements; and a movable body capable of relatively moving in parallel to an arranged direction of the first and second position information detecting elements, wherein the movable body has a position information generator positioned so as to come close to the first, second and third position information detecting elements, a first positioning is executed on the basis of a result of an arithmetic operation using an output from the first and second position information detecting elements in the case that the position information generator comes close to the first and second position information detecting elements, and a second positioning is executed on the basis of only an output from the third position information detecting element in the case that the position information generator comes close to the third position information detecting element.

Further, in accordance with the other aspect of the present invention, the second positioning is executed at a relative position at a time when a center of the position information generator comes closest to the third position information detecting element.

Further, in accordance with the other aspect of the present invention, there is provided a drive unit comprising:

one position information generator generating a position information;

a plurality of position information detecting elements detecting the position information and outputting an electric signal in correspondence thereto; and the drive unit executes a relative positioning between the position information generator and the position information detecting element on the basis of an output from the position information detecting elements, wherein a first positioning is executed on the basis of a result of an arithmetic operation using an output from two adjacent position information detecting elements in a plurality of position information detecting elements, and a second positioning is executed on the basis of a detection result of a point at which an output from one position information detecting element in a plurality of position information detecting elements becomes approximately zero.

Further, in accordance with the other aspect of the present invention, the position information generator has a physical quantity distribution which has an opposite sign and is symmetrical along a moving direction of the position information generator or the position information detector, on the basis of a center of a position information generating portion.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

A description will be given below of embodiments of a drive unit in accordance with the present invention on the basis of the accompanying drawings, however, the present invention is not limited to the embodiments.

Figure 1:
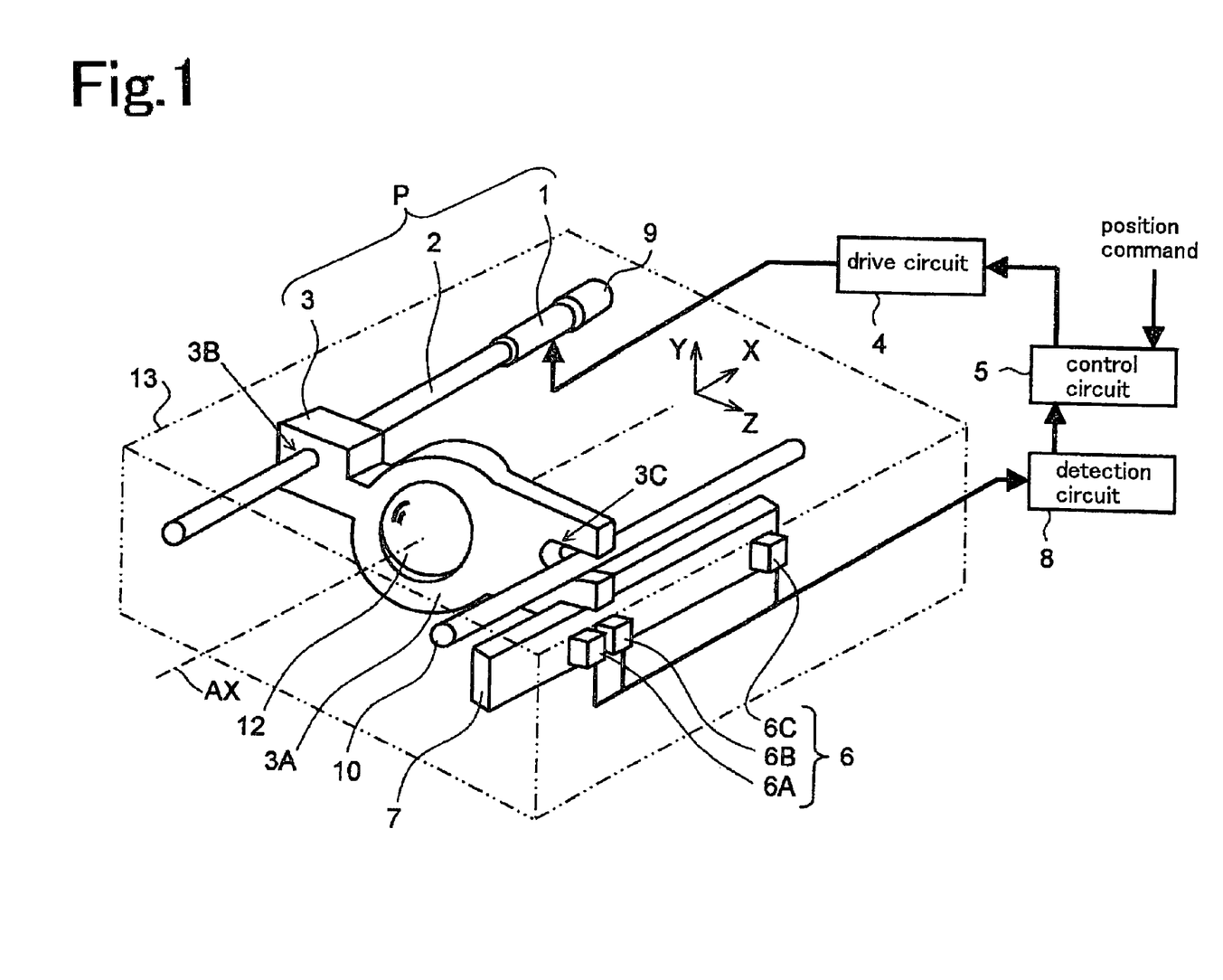
FIG. 1 is a system structure view showing an embodiment of a drive unit.
Figure 2:
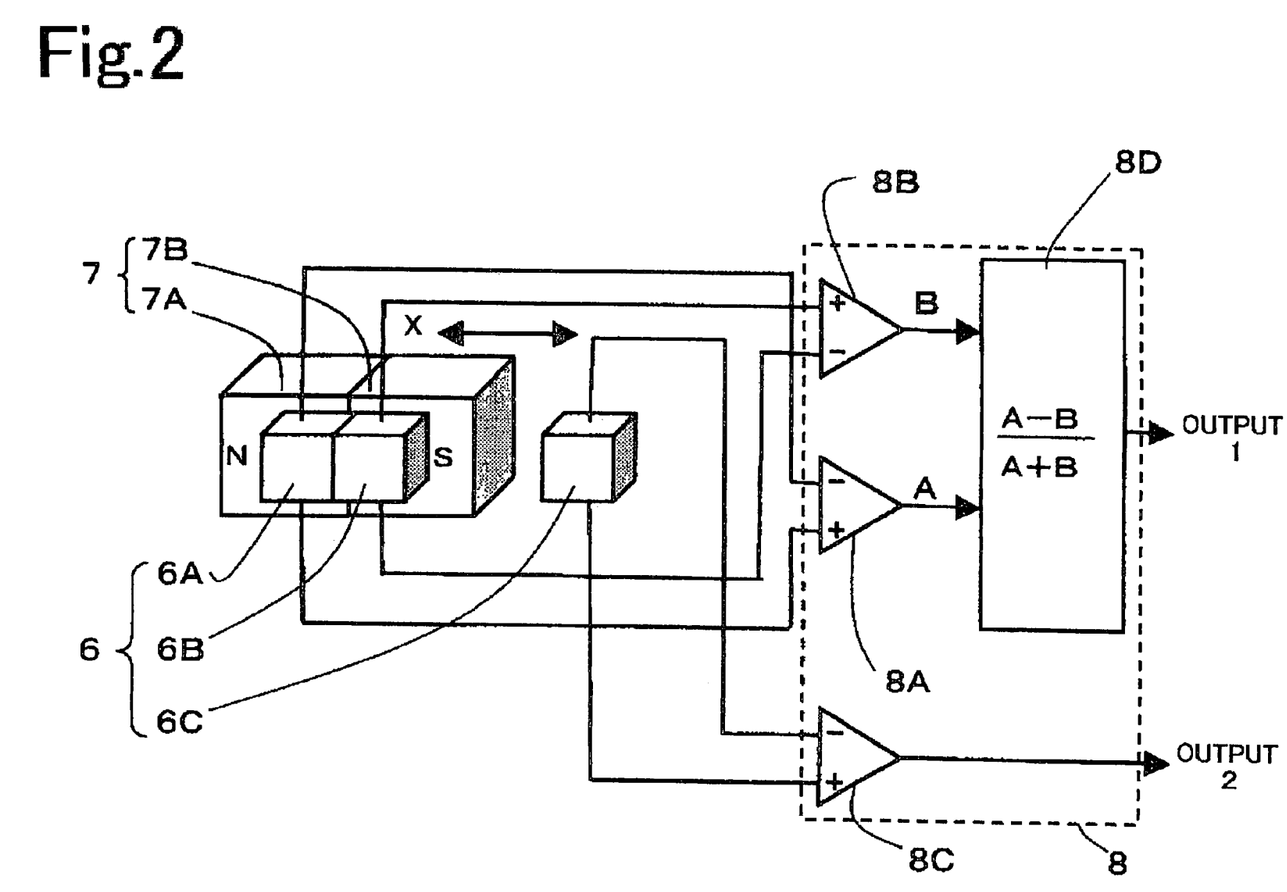
FIG. 2 is a system structure view showing a position sensor portion in the embodiment in FIG. 1.

FIG. 1 shows a system structure of a drive unit obtained by carrying out the present invention, and FIG. 2 in detail shows a portion constituting a position sensor (that is, a position sensor portion constituted by a magnetic field detecting device 6, a magnetic field generating member 7 and a detection circuit 8) in the drive unit (FIG. 1). The drive unit shown in FIG. 1 corresponds to a drive unit used for moving an optical element in an optical equipment, for example, an imaging apparatus (a digital camera, a video camera and the like), an optical pickup apparatus, an optical measuring apparatus or the like. A lens 12 is listed up as an example of the moved optical element, however, the embodiment can be applied even to a case of moving the other optical element than the lens.

The drive unit shown in FIG. 1 is provided with a piezoelectric actuator P (a driving device), a drive circuit 4 and a control circuit 5 driving the piezoelectric actuator P, a magnetic field generating member 7 integrally attached to a movable member 3 provided in the piezoelectric actuator P and having a surface magnetic field density changing in a forward and backward moving direction, a magnetic field detecting device 6 detecting the magnetic field generated by the magnetic field generating member 7, and a detection circuit (an operating device) 8 determining a position of the movable member 3 on the basis of a detection signal of the magnetic field detecting device 6. The magnetic field detecting device 6, the magnetic field generating member 7 and the detection circuit 8 constitute a position sensor portion detecting a position of a movable body (including the movable member 3, the magnetic field generating member 7 and the lens 12). Further, a lens holder portion 3A constituted by a part of the movable member 3 is structured such as to hold the lens 12. In this case, X, Y and Z in FIG. 1 show directions which are orthogonal to each other, a parallel direction to an optical axis AX of the lens 12 is set to a direction X, and an opposite direction between the magnetic field detecting device 6 and the magnetic field generating member 7 is set to a direction Z.

The piezoelectric actuator P is constituted by a piezoelectric element (for example, a piezo element) 1, a drive member (a guide shaft) 2 fixed to one end of the piezoelectric element 1, and the movable member 3 movably held to the drive member 2. The drive member 2 is firmly fixed to one end side of the piezoelectric element 1 in an electrostriction direction (an expansion and contraction direction) in accordance with a method such as an adhesion or the like, and the structure is made such that the drive member 2 is reciprocated (in the direction X) on the basis of an expansion and contraction of the piezoelectric element 1. On the other hand, the other end side of the piezoelectric element 1 is fixed to a mounting portion 9, and the mounting portion 9 is fixed to a casing 13. Accordingly, the piezoelectric element 1 is regulated in the expansion direction.

The movable member 3 is provided with a through hole 3B, and is attached to the drive member 2 with a predetermined friction engagement force in a state in which the drive member 2 is inserted to the through hole 3B. The movable member 3 is attached on the basis of a positional relation that the optical axis AX of the lens 12 is in parallel to the forward and backward moving direction of the movable member 3 (that is, the extending direction of the drive member 2). On the other hand, a concave engagement portion 3C is provided in the other end side of the movable member 3, and the movable member 3 is hooked on a secondary shaft 10 by an engagement portion 3C. The secondary shaft 10 is fixed to the casing 13 in such a manner as to be positioned in parallel to the extending direction of the drive member 2. Accordingly, a movement of the movable member 3 is guided by the drive member 2 and the secondary shaft 10.

The piezoelectric element 1 is slowly elongated at a time of being elongated in a feeding direction, and the drive member 2 is moved at a slow speed in the feeding direction in accordance with the piezoelectric element. Accordingly, the movable member 3 frictionally engaged with the drive member 2 is displaced in a synchronously following manner on the basis of a friction engagement force. Next, the piezoelectric element 1 is rapidly contracted, and the drive member 2 is moved at a rapid speed in a return direction in accordance with the piezoelectric element. Accordingly, a slip is generated in the friction engagement portion between the drive member 2 and the movable member 3. As a result, the movable member 3 is not displaced following to the axial displacement of the drive member 2, and is returned slightly in the return direction. The movable member 3 is moved in a direction moving apart from the piezoelectric element 1 on the axis of the drive member 2, by repeating the motion mentioned above. In this case, in the case of moving the movable member 3 in a direction coming close to the piezoelectric element 1, it is preferable to make the piezoelectric element 1 execute the inverse expansion and contraction to the motion mentioned above.

As a driving device used in the embodiment, it is desirable to employ a so-called "non-magnetic force type" driving device such as the piezoelectric actuator P mentioned above. In particular, it is desirable to employ a structure in which a surface magnetic flux density generated in accordance with the forward and backward movement of the movable member 3 provided with the driving device is equal to or less than 0.1 mT, and a maximum value of the surface magnetic flux density generated by the magnetic field generating member 7 is equal to or more than 1 mT. As mentioned above, a detection signal of the magnetic field detecting device 6 is not disturbed by a leakage flux and a precious positioning of the movable member 3 can be achieved, by suppressing the surface magnetic flux density generated by the motion of the driving device equal to or less than about one tenth the surface magnetic flux density generated by the magnetic field generating member 7. As the "non-magnetic force source type" driving device mentioned above, in addition to the piezoelectric actuator P, there can be listed up an ultrasonic actuator forward and backward moving the movable member 3 by using an ultrasonic motor, a shape memory actuator forward and backward moving the movable member 3 by using a shape memory member, and the like.

The control circuit 5 receives a position command (a displacement command of the movable member 3) applied from a host computer (not shown), and generates a drive control signal for moving the movable member 3 to a command position. The drive control signal is generated in such a manner that the movable member 3 moves at a predetermined moving amount in correspondence to a difference between the position signal of the movable member 3 transmitted from the detection circuit 8 and the position signal on the basis of the position command. The drive control signal generated as mentioned above is input to the drive circuit 4. The drive circuit 4 generates a drive signal driving the piezoelectric element 1 in such a manner that the movable member 3 moves at a predetermined moving amount, on the basis of the drive control signal, and actually drives the piezoelectric element 1.

The magnetic field generating member 7 is constituted by a single bar magnet having an N pole portion 7A and an S pole portion 7B, as shown in FIG. 2. Accordingly, a magnetic field is generated symmetrically from the magnetic field generating member 7 around a boundary between the N pole portion 7A and the S pole portion 7B. Further, in the magnetic field generating member 7, the N pole portion 7A and the S pole portion 7B are arranged laterally in a forward and backward moving direction (in the direction X) of the movable member 3, and the magnetic field detecting device 6 is arranged so as to face to the magnetic field generating member 7. In accordance with the magnetic field generating member 7 mentioned above, the surface magnetic flux density in the forward and backward moving direction of the movable member 3 is suddenly changed in a linear boundary between the N pole portion 7A and the S pole portion 7B. Accordingly, since it is possible to generate a great magnetic field fluctuation even in a little moving amount, it is possible to shorten a movable range of the movable body. Further, the magnetic field generating member 7 is integrally provided with the movable member 3. Accordingly, the movable member 3, the lens 12 and the magnetic field generating member 7 are integrally moved. In this case, the movable member 3 and the magnetic field generating member 7 may be directly or indirectly fixed.

The magnetic field generating member 7 may be structured as far as the surface magnetic flux density is changed in the forward and backward direction of the movable member 3. In other words, a changing aspect of the surface magnetic flux density is not particularly limited, but the changing aspect may be provided with a changing aspect that the surface magnetic field density change caused by its own forward and backward movement is applied to the fixedly arranged magnetic field detecting device 6. In this case, it is preferable for executing a precise position detection that a magnetic force line generated in the magnetic field generating member 7 is symmetrical to a plane which is vertical to the relative moving direction between the magnetic field generating member 7 and the magnetic field detecting device 6 (the direction X), and passes through a center of the magnetic field generating member 7.

Figure 5A:
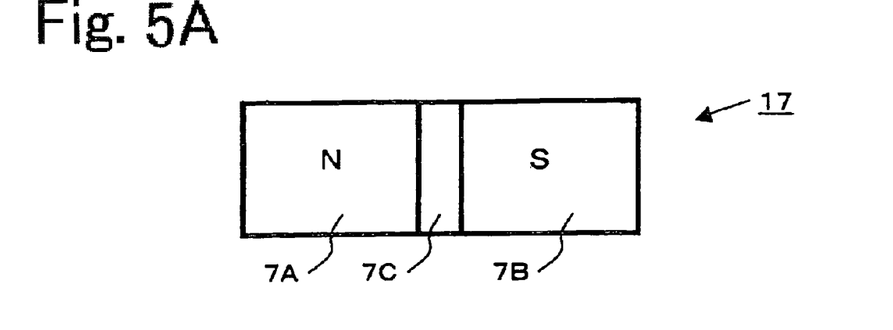
FIG. 5 is a front elevational view showing a concrete example of the other magnetic field generating member which can be used in the embodiment in FIG. 1.
Figure 5B:
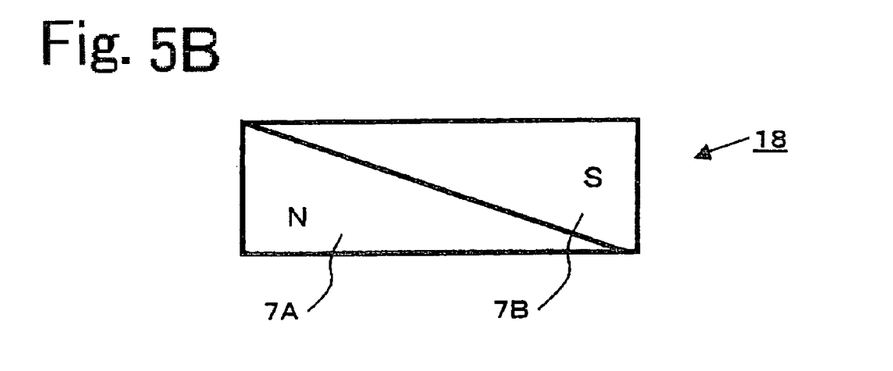

FIG. 5 shows the other concrete example of the magnetic field generating member 7. FIG. 5A shows a magnetic field generating member 17 having a non-magnetized portion 7C between the N pole portion 7A and the S pole portion 7B, and FIG. 5B shows a magnetic field generating member 18 in which both of the N pole portion 7A and the S pole portion 7B are formed in a triangular shape. Whichever cases of using the magnetic field generating member 17 or 18, an output is changed slowly, and an influence of a relative slope with respect to the magnetic field detecting device 6 is hard to be generated. In this case, the magnetic field generating members 7, 17 and 18 may be formed in a square pole shape or structured by sticking triangle pole magnets, and may be structured by using a magnetized sheet or the like in place of the magnet.

The magnetic field detecting device 6 is fixed to the casing 13 near a moving path of the magnetic field generating member 7. The magnetic field detecting device 6 is structured such as to detect a magnetic field change in accordance with the movement of the magnetic field generating member 7 (on the basis of the forward and backward movement of the movable member 3), and is constituted by first, second and third magnetic field detecting elements 6A, 6B and 6C detecting the magnetic field. As the first, second and third magnetic field detecting elements 6A, 6B and 6C, it is possible to employ various magnetic sensors outputting an electric signal in correspondence to the detected magnetic field. As a typical structure, there can be listed up a Hall element, an MR element, an MI element and the like. Among them, since the Hall element is generally compact, is excellent in a built-in property to this kind of drive unit and is inexpensive, the Hall element is preferably employed. Accordingly, it is preferable that at least one of the first, second and third magnetic field detecting elements 6A, 6B and 6C includes the Hall element.

Further, the first, second and third magnetic field detecting elements 6A, 6B and 6C are arranged so as to face to the magnetic field generating member 7 along the forward and backward moving direction of the magnetic field generating member 7. In other words, they are arranged in parallel to a guide direction of the drive member (the guide shaft) 2 guiding the movement of the magnetic field generating member 7 or the like. It is possible to make a position sensor portion a simple structure on the basis of the arrangement. The case of using three magnetic field magnetic field detecting elements 6A, 6B and 6C is shown here, however, four or more magnetic field detecting elements may be arranged in line.

As mentioned above, the magnetic field generating member 7 is fixed to the movable member 3 in such a manner as to face to the magnetic field detecting device 6, and the first, second and third magnetic field detecting elements 6A, 6B and 6C are fixedly arranged in line along the forward and backward moving direction of the magnetic field generating member 7. In other words, the movable body such as the movable member 3 or the like moves in parallel to the arranged direction of the first, second and third magnetic field detecting elements 6A, 6B and 6C. Further, the surface magnetic flux density of the magnetic field generating member 7 reaches a positive maximum value near one end portion, becomes zero in a center portion and reaches a negative maximum value near the other end portion, with respect to the forward and backward moving direction. Accordingly, if the magnetic field generating member 7 is moved in the direction X, the magnetic field around each of the magnetic field detecting elements 6A, 6B and 6C is changed in correspondence to the change of the surface magnetic field density applied from the magnetic field generating member 7. Accordingly, the output signal detected by each of the magnetic field detecting elements 6A, 6B and 6C is changed.

The detection circuit 8 has a function serving as an arithmetic means for determining a position of the movable member 3 on the basis of the detection signal of the magnetic field detecting device 6. For example, the magnetic field detection signals respectively detected by the first and second magnetic field detecting elements 6A and 6B are input to the detection circuit 8, and the detection circuit 8 amplifies and operates two magnetic field detection signals, thereby generating a position signal corresponding to a current position information of the movable member 3. The position signal generated here is output to the control circuit 5 (an output 1). On the other hand, the magnetic field detection signal detected by the third magnetic field detection element 6C is input to the detection circuit 8, and the detection circuit 8 amplifies the magnetic field detection signal, thereby generating the position signal corresponding to the current position information of the movable member 3. The position signal generated here is output to the control circuit 5 (an output 2).

As shown in FIGS. 1 and 2, the first and second magnetic field detecting elements 6A and 6B are arranged adjacently, and the third magnetic field detecting element 6C is arranged at a position apart from the first and second magnetic field detecting elements 6A and 6B. It is possible to execute the positioning of two kinds and three points at a high precision by arranging each of the magnetic field detecting elements 6A, 6B and 6C. The positioning corresponds to a relative positioning between the magnetic field generating member 7 and the magnetic field detecting device 6 which is executed on the basis of the detection result in the magnetic field detecting device 6 (that is, the output from each of the magnetic field detecting elements 6A, 6B and 6C). In this case, the first and second magnetic field detecting elements 6A and 6B arranged adjacently may be arranged in a contact state, or may be arranged in a close state at a predetermined interval.

Figure 3:
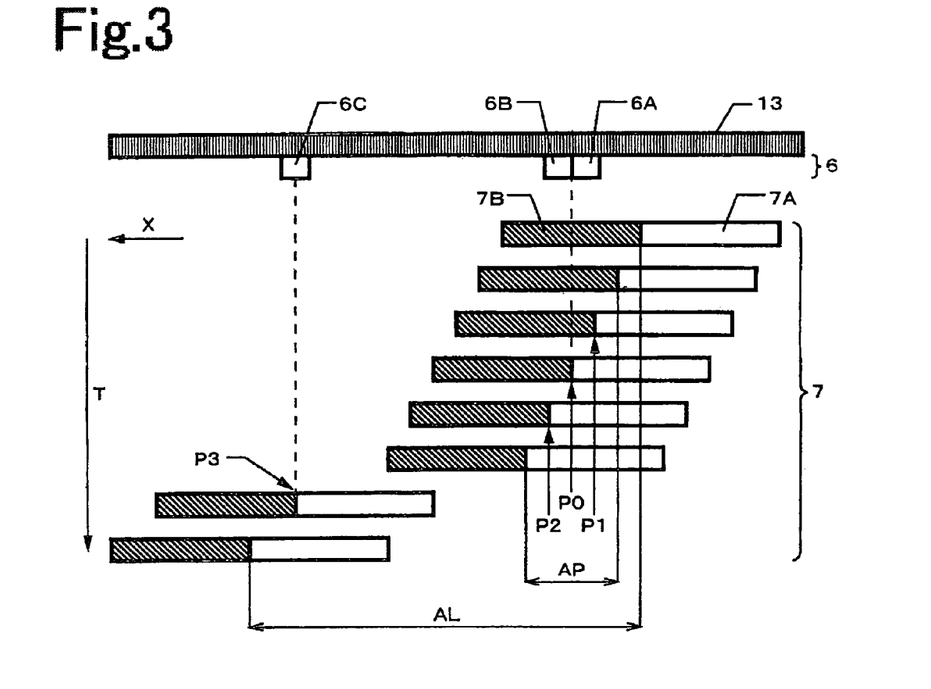
FIG. 3 is a schematic view for explaining a positional relation between a magnetic field generating member moving in the position sensor portion in FIG. 2 and a magnetic field detecting device detecting a position thereof.
Figure 4:
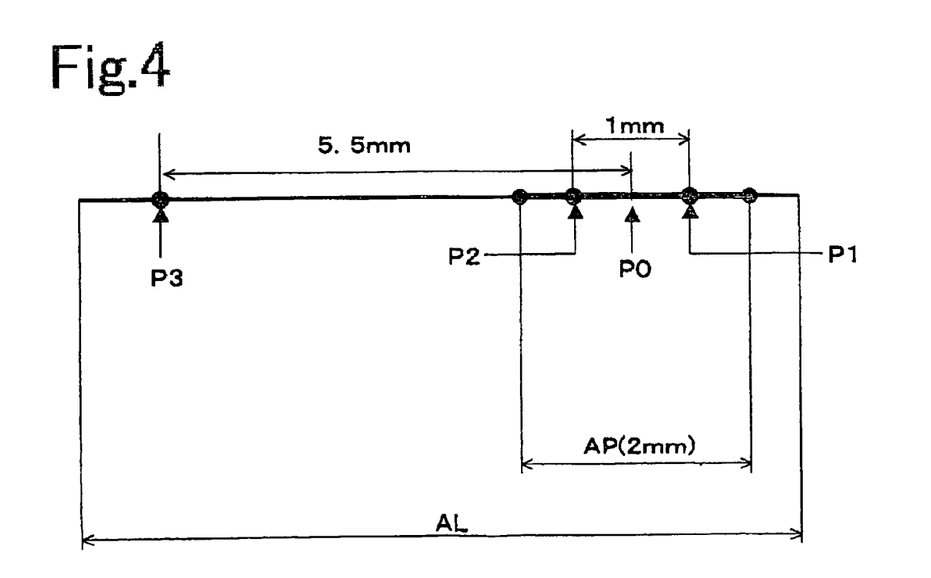
FIG. 4 is a schematic view showing a detecting point and a detecting region in FIG. 3 in an extracted manner.

FIG. 3 shows a positional relation between the magnetic field generating member 7 moving in the position sensor portion (FIG. 2) and the magnetic field detecting device 6 detecting the position thereof, and a detection point and a detection region are extracted and shown in FIG. 4. FIG. 3 shows a state in which the magnetic field generating member 7 moves in the direction X (from the first magnetic field detecting element 6A to the third magnetic field detecting element 6C side), with respect to the fixed first, second and third magnetic field detecting elements 6A, 6B and 6C along an elapse of a time T. In this case, the position of the movable body is expressed on the basis of the center of the magnetic field generating member 7.

In this embodiment, the positioning of two kinds and three points is executed in a movable range AL of the movable body. The first positioning is executed on the basis of the detection result of the first and second magnetic field detecting elements 6A and 6B in a position detection necessary region AP, and the second positioning is executed on the basis of the detection result of the magnetic field detecting element 6C in a third point P3 apart from the position detection necessary region AP. A positioning point detected by the first positioning is constituted by a first point P1 and a second point P2 (an interval of which is, for example, 1 mm), and a point P0 corresponds to a detection point at which the output 1 is zero.

The position detection necessary region AP corresponds to a region in which a high-precision position detection (about ±20 μm) is necessary in all the regions. For example, it corresponds to a region (for example, 2 mm) for accurately detecting the position of the lens 12, in the case that it is necessary to fine adjust the position of the lens 12 for compensating an aberration fluctuating due to various reasons. On the other hand, a third point P3 apart from the position detection necessary region AP exists at a position (in which an interval from the point P0 is, for example, 5.5 mm) which is not required a high-precision position detection in comparison with the range of the position detection necessary region AP, however, is required a certain level of detection position precision (about ±100 μm). In this case, the other region than the position detection necessary region AP and the third point P3 is set to a level that the moving direction is known, and a detailed position detection is not required.

In the case that the detection position for the positioning is separated into two apart sections as mentioned above, the detection is executed at the position apart from the detection point P0 of the output zero if it is intended to detect the position of the magnetic field generating member 7 with respect to the magnetic field detecting device 6 only in the position detection necessary region AP. Accordingly, a necessary position precision can not be obtained. In other words, it is impossible to execute the position detection at a necessary precision for the second positioning by the first and second magnetic field detecting elements 6A and 6B used for the first positioning. If the magnetic field generating member 7 is elongated for increasing the position precision, the drive unit is enlarged in size. Further, even if the magnetic field generating member 7 is elongated, it is hard to obtain a necessary position precision.

The embodiment is structured such that the position detection at the third point P3 apart from the position detection necessary region AP is executed, by using the third magnetic field detecting element 6C. In other words, the structure is made such that when the magnetic field generating member 7 moves close to the third magnetic field detecting element 6C, the second positioning is executed on the basis of only the output (the output 2) from the third magnetic field detecting element 6C. Accordingly, it is possible to obtain a necessary position precision. The structure may be made such that the position of the third point P3 is detected by two or more magnetic field detecting elements, however, if the structure is made such that the second positioning is executed on the basis of the detection result of the point in which the output from the third magnetic field detecting element 6C becomes zero, it is possible to secure a certain degree higher detection position precision only by the magnetic field detecting element 6C. Further, if the structure is made such as to detect the output zero point, there is an advantage that the detection is hard to be affected by a relative position fluctuation (a mounting error or the like) in the direction Z between the magnetic field generating member 7 and the magnetic field detecting device 6, a temperature property of the magnetic field generating member 7 and the magnetic field detecting device 6 and the like. Accordingly, it is preferable to execute the second positioning at a relative position at a time when the center of the magnetic field generating member 7 is closest to the third magnetic field detecting element 6C.

In this embodiment, the structure is made such that the position detection at the first and second points P1 and P2 is executed by using the first and second magnetic field detecting elements 6A and 6B. In other words, the structure is made such that when the magnetic field generating member 7 moves close to the first and second magnetic field detecting elements 6A and 6B, the first positioning is executed on the basis of the result (the output 1) of the operation using the outputs from the first and second magnetic field detecting elements 6A and 6B. In accordance with the structure in which the positioning within the position detection necessary region AP is executed by the first and second magnetic field detecting elements 6A and 6B arranged adjacently, the detection is hard to be affected by the temperature property of the magnetic field generating member 7 and the magnetic field detecting device 6, whereby it is possible to execute a high-precision position detection. A description will be given below of details thereof.

The detection circuit 8 (FIG. 2) is provided with first, second and third adders 8A, 8B and 8C constituted by an operational amplifier, and a computing element 8D executing an arithmetic processing on the basis of output values of the first adder 8A and the second adder 8B. The first adder 8A is structured such as to amplify an output electric signal which the first magnetic field detecting element 6A detects the magnetic field so as to output, and a plus side terminal of the first magnetic field detecting element 6A is connected to a non-inverting input terminal of the first adder 8A. Further, a minus side terminal of the first magnetic field detecting element 6A is connected to an inverting input terminal of the first adder 8A. On the other hand, the second adder 8B is structured such as to amplify an output electric signal which the second magnetic field detecting element 6B detects the magnetic field so as to output, and a plus side terminal of the second magnetic field detecting element 6B is connected to an inverting input terminal of the second adder 8B. Further, a minus side terminal of the second magnetic field detecting element 6B is connected to a non-inverting input terminal of the second adder 8B. As mentioned above, polarities connected to the first adder 8A and the second adder 8B are changed respectively between the first magnetic field detecting element 6A and the second magnetic field detecting element 6B, because the first magnetic field detecting element 6A predominantly detects the N-pole magnetic flux of the magnetic field generating member 7, and the second magnetic field detecting element 6B predominantly detects the S-pole magnetic flux of the magnetic field generating member 7, whereby the arithmetic processing is easily executed in the rear stage of computing element 8D by inverting the polarity.

The computing element 8D executes the operation on the basis of the following formula (f1), and transmits the result of the operation as the position information of the movable member 3 (that is, the current position information of the lens 12) to the control circuit 5.

$$K \cdot (A-B)/(A+B) \qquad (f1)$$

in the formula

A: output of electric signal from first magnetic field detecting element

B: output of electric signal from second magnetic field detecting element

K: proportionality factor

An object for executing the arithmetic processing of $(A-B)/(A+B)$ mentioned above in the computing element 8D is to improve an operating environment temperature property of the position signal of the movable member 3 detected by the detection circuit 8. For example, if the environment temperature is changed, the magnetic flux density of the magnet is changed due to the temperature property thereof. In the case that the environment temperature is increased, the surface magnetic flux density is lowered due to the temperature property of the magnetic flux generating member 7. In accordance with this, the output values of the first and second magnetic flux detecting elements 6A and 6B tend to be lowered in accordance with the increase in the environment temperature. The computing element 8D executes the arithmetic processing in such a manner that it is possible to execute the position detection of the movable member 3 without being affected by the output value reduction of the first and second magnetic field detecting elements 6A and 6B caused by the change in the operating environment temperature mentioned above. In other words, since the position detection of the movable member 3 is executed on the basis of two output signals output from the first magnetic field detecting element 6A and the second magnetic field detecting element 6B, it is possible to accurately execute the position detection without being substantially affected by the change in the operating environment temperature of the optical equipment.

The computing element 8D may be functioned as a temperature sensor (a temperature detecting means) by utilizing a matter that the output values of the first magnetic field detecting element 6A and the second magnetic field detecting element 6B are increased and decreased in correspondence to the operating environment temperature, in addition to using the computing result of $(A-B)/(A+B)$ by the computing element 8D as the position signal of the movable member 3. In other words, the temperatures in the installed portions of the first and second magnetic field detecting elements 6A and 6B are detected on the basis of the value of the output A of the electric signal from the first magnetic field detecting element 6A, the value of the output B of the electric signal from the second magnetic field detecting element 6B or the combined value of the outputs A and B of the electric signals from the first and second magnetic field detecting elements 6A and 6B, and a temperature compensation of the third magnetic field detecting element 6C used for the second positioning may be achieved on the basis of the detection result. On the basis of the temperature compensation, it is possible to further reduce the effect of the temperature property of the magnetic field detecting device 6.

This embodiment is structured such that the magnetic field detecting device 6 is fixed, and the magnetic field generating member 7 is moved, however, the structure may be made such that the arrangement relation between the magnetic field detecting device 6 and the magnetic field generating member 7 is replaced. In other words, the structure may be made such that the position of the magnetic field generating member 7 is fixed by attaching the magnetic field generating member 7 to the casing 13, and the movable member 3, the lens 12 and the magnetic field detecting device 6 are integrally moved by attaching the magnetic field detecting device 6 to the movable member 3 or an integral portion therewith. In this case, it is possible to execute the substantially same motion as mentioned above. There is a risk that a wiring member (FPC, lead wire or the like) connected to each of the magnetic field detecting elements 6A; 6B and 6C is bent, however, there is an advantage that it is not necessary to secure a moving space of the magnetic field generating member 7. Accordingly, it is possible to achieve a space saving as a whole.

In the embodiment mentioned above, the structure is made such as to utilize the generation and the detection of the magnetic field for detecting the position of the movable body, however, the structure is not limited to this as far as the structure executes the generation and the detection of the position information of the movable body. For example, it is possible to employ a light intensity converting member (a light shielding plate, a reflecting plate, a black and white chart or the like) in place of the magnetic field generating member (the magnet or the like) 7, and employ a light detecting means (a light transmitting type photo interrupter, a light reflecting type photo interrupter or the like) constituted by a light emitting portion and a light receiving portion in place of the magnetic field detecting device 6 constituted by the magnetic field detecting elements (Hall elements or the like) 6A, 6B and 6C. In this case, it is possible to execute the substantially same motion as mentioned above.

Figure 6:
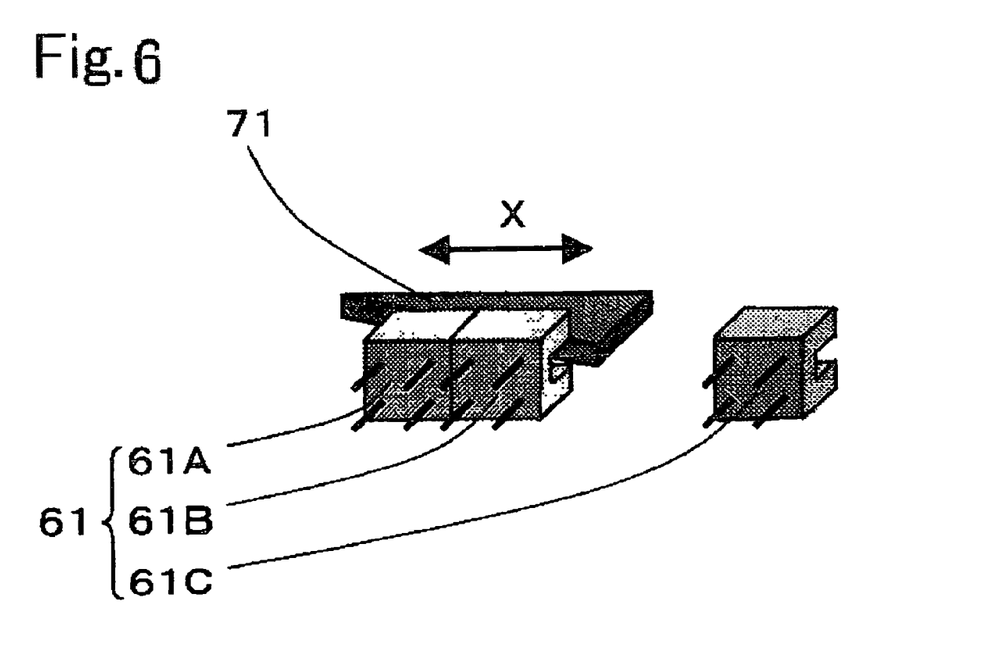
FIG. 6 is a perspective view showing a position sensor portion constituting the other embodiment of the drive unit.
Figure 7:
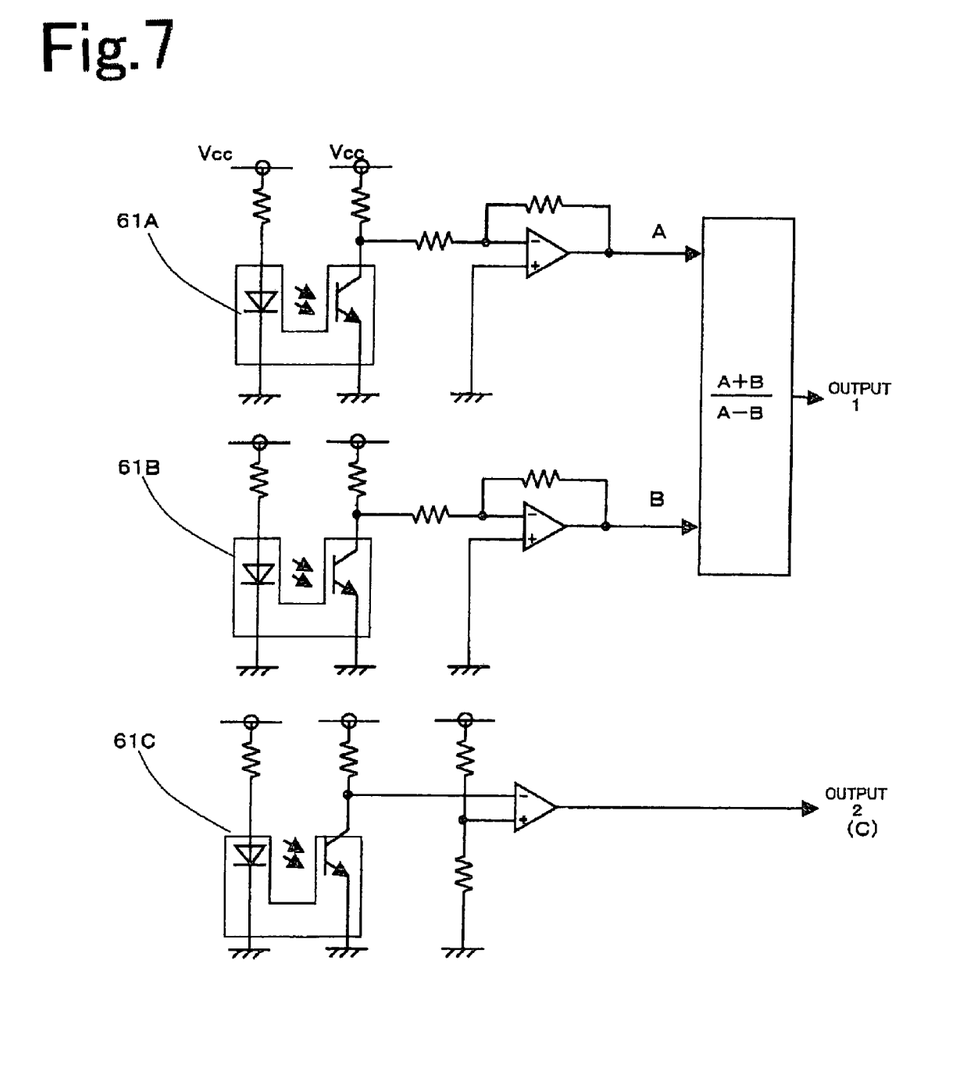
FIG. 7 is a circuit diagram showing the position sensor portion in FIG. 6.

A description will be given below of an embodiment in which the optical position sensor portion is structured by using the photo interrupter. In this case, since the other portions than the position sensor portion are formed by the same structures as those in the embodiment (FIG. 1) mentioned above, a detailed description thereof will not be made. FIG. 6 shows a light shielding plate 71 and a light detecting means 61 constituting the position sensor portion, and FIG. 7 shows a circuit structure of the position sensor portion. The light shielding plate 71 is constituted by a thin plate formed in a right angles triangle shape, and the light detecting means 61 is constituted by first, second and third photo interrupters 61A, 61B and 61C detecting a position of the moving light shielding plate 71. The first, second and third photo interrupters 61A, 61B and 61C are light detecting elements corresponding to the first, second and third magnetic field detecting elements 6A, 6B and 6C, and all of them are constituted by a general transmission type photo interrupter. The photo interrupters 61A and 61B amplify an open corrector output after pulling up as shown in FIG. 7. The formula (A+B)/(A−B) is computed from two outputs A and B, and a result is set to the output 1. Since the photo interrupter 61C passes through a comparator, the output is selectively switched to any one of about 0 and about V cc (5 V).

Figure 8:
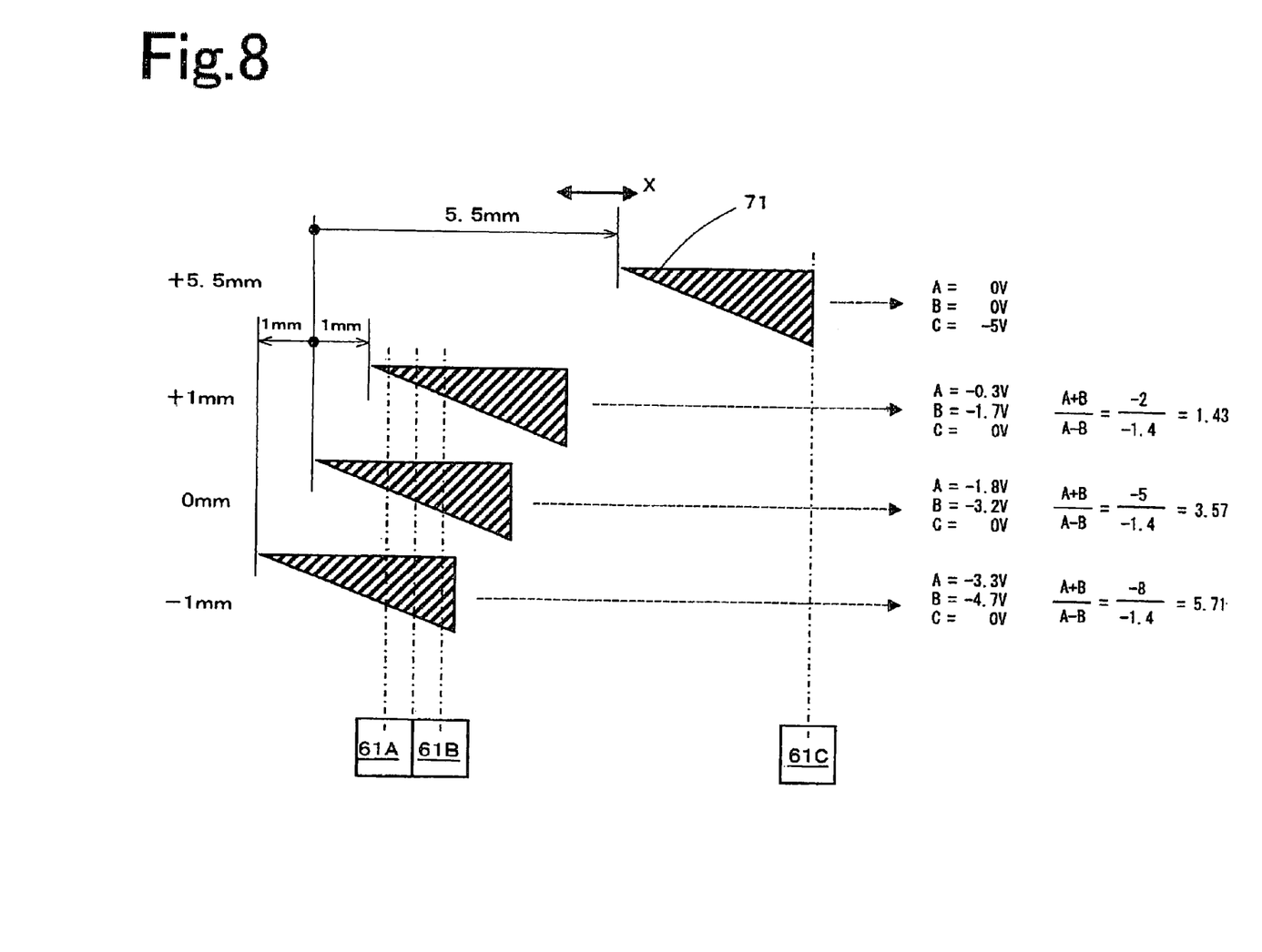
FIG. 8 is a schematic view showing a relation between a position and an output of a photo interrupter and a light shielding plate in the position sensor portion in FIG. 6.

FIG. 8 shows a relation between the position and the output of the photo interrupters 61A to 61C and the light shielding plate 71. As is known from FIG. 8, it is possible to obtain the output which is approximately in proportion to the position of the light shielding plate 71 within a predetermined region (a range of ±1 mm from reference position) from each of the photo interrupters 61A and 61B, by making the shape of the light shielding plate 71 proper. Accordingly, the formula (A+B)/(A−B) comes to a value which is in proportion to the position of the light shielding plate 71, and even if the temperature fluctuation exist, it is cancelled by the calculation mentioned above, in the same manner as the Hall element. On the other hand, with respect to the photo interrupter 61C, since the output of the photo interrupter 61C suddenly rises up from the circuit by detecting an edge portion of the light shielding plate 71, it is possible to detect the position precisely and at a pin point. In the same manner as the case of the combination between the Hall element and the magnet, it is hardly affected by the fluctuation in the direction Z (FIG. 1) and the temperature property of the photo interrupter, and since the temperature property is not generated in the light shielding plate as is different from the magnet, it is not affected thereby.

Figure 9:
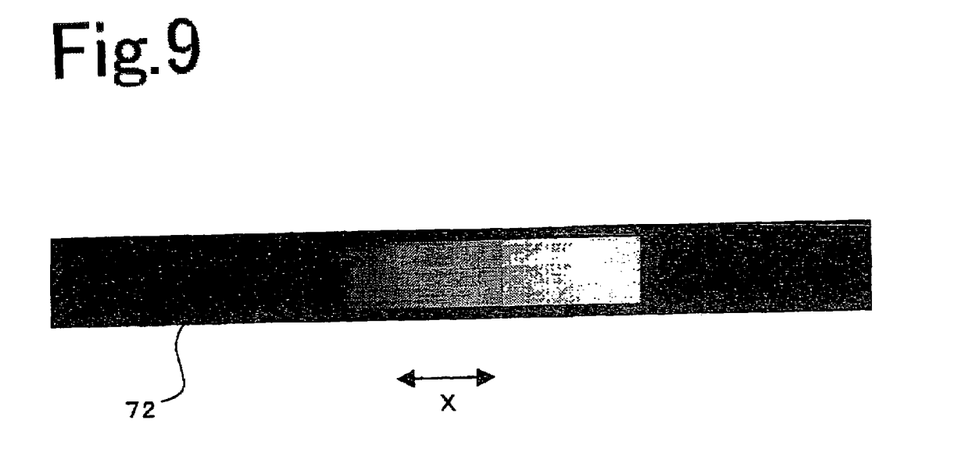
FIG. 9 is a plan view showing an outer appearance of a reflecting plate used in the other embodiment of the drive unit.

FIG. 9 shows a reflecting plate (for example, a black and white chart) 72 used in the case that a reflection type photo interrupter (that is, a photo reflector) is used as the light detecting element for detecting the position. Since the light is reflected by the white portion of the reflecting plate 72 and the light is absorbed by the black portion, the same effect as that of the embodiment shown in FIGS. 6 to 8 can be obtained by detecting the black and white switching portion by means of the third photo reflector executing the position detection of the third point P3 (FIGS. 3 and 4). An arrangement of the black and white executing the reflection and absorption may be inverted. Further, in the case of using a transmission type film in which a white portion is constituted by a transmission portion and a black portion is constituted by a light shielding portion, it is possible to correspond to any one of the transmission type and reflection type photo interrupters.

Further, in the case that the magnet, the reflecting plate and the like are set as the position information generator, and the Hall element, the photo interrupter and the like are set as the position information detector, the position information generator and the position information detector interact with each other so as to output the signal based on the relative displacement between two elements from the position information detector, and in the case that the structure is made such that the position information generator has a predetermined magnitude along a direction of the position information to be known, whereby a distribution of a physical quantity exists in the direction, and the physical quantity is detected by the position information detector, it is possible to detect the position of the movable body so as to position.

In accordance with the present embodiment, even in the case that a plurality of position detecting points of the movable body exist at a wide interval, it is possible to position the movable body at a high precision. Further, if the drive unit having the structure mentioned above is employed in the optical equipment in which the high positioning precision is required, it can contribute to a weight saving, a compact structure, a cost reduction and the like in addition to a high performance and a high function.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A drive unit comprising:
   a magnetic field generating member for generating a magnetic field;
   a magnetic field detecting device including first, second and third magnetic field detecting elements for detecting the magnetic field;
   a driving device for moving the magnetic field generating member or the magnetic field detecting device; and
   the drive unit executing a relative positioning between the magnetic field generating member and the magnetic field detecting device on the basis of a detection result by the magnetic field detecting device,
   wherein a first positioning is executed on the basis of the detection result of the first and second magnetic field detecting elements in a predetermined region, and a second positioning is executed on the basis of the detection result of the third magnetic field detecting element at a predetermined point apart from the predetermined region, within a movable range in which the magnetic field generating member or the magnetic field detecting device moves.

2. A drive unit of claim 1, wherein
   the second positioning is executed at a relative position at a time when a center of the magnetic field generating member comes closest to the third magnetic field detecting element.

3. A drive unit of claim 1, wherein
   a magnetic force line generated in the magnetic field generating member is symmetrical with respect to a plane which is vertical to a relative moving direction between the magnetic field generating member and the magnetic field detecting device and passes through a center of the magnetic field generating member.

4. A drive unit of claim 1, wherein
   the driving device is provided with a guide shaft guiding the movement of the magnetic field generating member or the magnetic field detecting device, and the first, second and third magnetic field detecting elements are arranged in parallel to a guide direction of the guide shaft.

5. A drive unit of claim 1, wherein
   both of the first and second magnetic field detecting elements output an electric signal corresponding to the detected magnetic field, and execute the first positioning on the basis of a result of an arithmetic operation in accordance with the following formula (f1)

$$K \cdot (A-B)/(A+B) \quad \text{(f1)}$$

in the formula

A: output of electric signal from first magnetic field detecting element

B: output of electric signal from second magnetic field detecting element

K: proportionality factor.

6. A drive unit comprising:

first and second magnetic field detecting elements arranged in adjacent to each other;

a third magnetic field detecting element arranged at a position apart from the first and second magnetic field detecting elements; and a movable body capable of relatively moving in parallel to an arranged direction of the first and second magnetic field detecting elements, wherein the movable body has a magnetic field generating member positioned so as to come close to the first, second and third magnetic field detecting elements, a first positioning is executed on the basis of a result of an arithmetic operation using an output from the first and second magnetic field detecting elements in the case that the magnetic field generating member comes close to the first and second magnetic field detecting elements, and a second positioning is executed on the basis of only an output from the third magnetic field detecting element in the case that the magnetic field generating member comes close to the third magnetic field detecting element.

7. A drive unit comprising:

one magnetic field generating member for generating a magnetic field symmetrically;

a plurality of magnetic field detecting elements for detecting the magnetic field and outputting an electric signal in correspondence thereto; and the drive unit executing a relative positioning between the magnetic field generating member and the magnetic field detecting element on the basis of an output from the magnetic field detecting elements, wherein a first positioning is executed on the basis of a result of an arithmetic operation using an output from two adjacent magnetic field detecting elements in a plurality of magnetic field detecting elements, and a second positioning is executed on the basis of a detection result of a point at which an output from one magnetic field detecting element in a plurality of magnetic field detecting elements becomes approximately zero.

8. A drive unit of claim 7, wherein one magnetic field detecting element used for the second positioning corresponds to the other magnetic field detecting element than two magnetic field detecting elements used for the first positioning.

9. A drive unit of claim 7, wherein both of two magnetic field detecting elements used for the first positioning correspond to the first and second magnetic field detecting elements outputting an electric signal in correspondence to the detected magnetic field, and execute the first positioning on the basis of a result of an arithmetic operation in accordance with the following formula (f1)

$$K \cdot (A-B)/(A+B) \quad \text{(f1)}$$

in the formula

A: output of electric signal from first magnetic field detecting element

B: output of electric signal from second magnetic field detecting element

K: proportionality factor.

10. A drive unit of claim 9, wherein temperatures in portions where the first and second magnetic field detecting elements are installed are detected on the basis of a value of an output A of an electric signal from the first magnetic field detecting element, a value of an output B of an electric signal from the second magnetic field detecting element, or a combined value of the outputs A and B of the electric signal from the first and second magnetic field detecting elements and a temperature compensation of one magnetic field detecting element used for the second positioning is executed on the basis of the detection result.

11. A drive unit of claim 9, wherein at least one of the first, second and third magnetic field detecting elements includes a Hall element.

12. A drive unit comprising:

a position information generator for generating a position information;

a position information detector including first, second and third position information detecting elements for detecting the position information; and a driving device for moving the position information generator or the position information detector, wherein the drive unit executes a relative positioning between the position information generator and the position information detector on the basis of a detection result in the position information detector, and wherein a first positioning is executed on the basis of the detection result of the first and second position information detecting elements in a predetermined region, and a second positioning is executed on the basis of the detection result of the third position information detecting element at a predetermined point apart from the predetermined region, within a movable range in which the position information generator or the position information detector moves.

13. A drive unit of claim 12, wherein the first positioning is executed within a range in which each of the outputs of the first position information detecting element and the second position information detecting element does not reach a minimum value, or a maximum value, and the second positioning is executed at a position at which the output of the third position information detecting element comes to the minimum value or the maximum value.

14. A drive unit of claim 12, wherein the position information generator has a physical quantity distribution which has an opposite sign and is symmetrical along a moving direction of the position information generator or the position information detector, on the basis of a center of a position information generating portion.

15. A drive unit of claim 12, wherein the first, second and third position information detecting elements include an optical device having a light emitting portion and a light receiving portion, and the position information generator is provided with a function of receiving the light emitted from the light emitting portion so as to make a quantity of light incident to the light receiving portion variable.

16. A drive unit of claim 12, wherein the driving device includes a piezoelectric actuator which is provided with a piezoelectric element, a drive member fixed to one end of the piezoelectric element, and a movable member movably held to the drive member.

17. A drive unit of claim 12, wherein:

said position information generator comprises a magnetic field generating member for generating a magnetic field;

said position information detector comprises a magnetic field detecting device and wherein said first, second and third position information detecting elements for detecting the position information comprise first, second and third magnetic field detecting elements, respectively, for detecting the magnetic field.

18. A drive unit of claim 17, wherein:

the second positioning is executed at a relative position at a time when a center of the magnetic field generating member comes closest to the third magnetic field detecting element.

19. A drive unit of claim 17, wherein:

a magnetic force line generated in the magnetic field generating member is symmetrical with respect to a plane which is vertical to a relative moving direction between the magnetic field generating member and the magnetic field detecting device and passes through a center of the magnetic field generating member.

20. A drive unit of claim 17, wherein:

the driving device is provided with a guide shaft guiding the movement of the magnetic field generating member or the magnetic field detecting device, and the first, second and third magnetic field detecting elements are arranged in parallel to a guide direction of the guide shaft.

21. A drive unit of claim 17, wherein:

both of the first and second magnetic field detecting elements output an electric signal corresponding to the detected magnetic field, and execute the first positioning on the basis of a result of an arithmetic operation in accordance with the following formula (f1)

$$K \cdot (A-B)/(A+B) \tag{f1}$$

in the formula

A: output of electric signal from first magnetic field detecting element

B: output of electric signal from second magnetic field detecting element

K: proportionality factor.

22. A drive unit comprising:

first and second position information detecting elements arranged in adjacent to each other;

a third position information detecting element arranged at a position apart from the first and second position information detecting elements; and a movable body capable of relatively moving in parallel to an arranged direction of the first and second position information detecting elements, wherein the movable body has a position information generator positioned so as to come close to the first, second and third position information detecting elements, a first positioning is executed on the basis of a result of an arithmetic operation using an output from the first and second position information detecting elements in the case that the position information generator comes close to the first and second position information detecting elements, and a second positioning is executed on the basis of only an output from the third position information detecting element in the case that the position information generator comes close to the third position information detecting element.

23. A drive unit of claim 22, wherein the second positioning is executed at a relative position at a time when a center of the position information generator comes closest to the third position information detecting element.

24. A drive unit comprising:

one position information generator generating a position information;

a plurality of position information detecting elements detecting the position information and outputting an electric signal in correspondence thereto; and the drive unit executes a relative positioning between the position information generator and the position information detecting elements on the basis of an output from the position information detecting elements, wherein a first positioning is executed on the basis of a result of an arithmetic operation using an output from two adjacent position information detecting elements in a plurality of position information detecting elements, and a second positioning is executed on the basis of a detection result of a point at which an output from one position information detecting element in a plurality of position information detecting elements becomes approximately zero.

25. A drive unit of claim 24, wherein the position information generator has a physical quantity distribution which has an opposite sign and is symmetrical along a moving direction of the position information generator or the position information detector, on the basis of a center of a position information generating portion.

* * * * *